US007480328B2

(12) United States Patent
Pauly et al.

(10) Patent No.: US 7,480,328 B2
(45) Date of Patent: Jan. 20, 2009

(54) SIGNAL GENERATOR WITH DISPLAY UNIT

(75) Inventors: Andreas Pauly, Munich (DE); Thomas Braunstorfinger, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 498 days.

(21) Appl. No.: 10/477,940

(22) PCT Filed: Apr. 30, 2002

(86) PCT No.: PCT/EP02/04763

§ 371 (c)(1), (2), (4) Date: May 18, 2004

(87) PCT Pub. No.: WO02/095994

PCT Pub. Date: Nov. 28, 2002

(65) Prior Publication Data

US 2004/0184554 A1 Sep. 23, 2004

(30) Foreign Application Priority Data

May 18, 2001 (DE) ................. 101 24 371
Jun. 27, 2001 (DE) ................. 101 30 943

(51) Int. Cl.
*H04L 27/04* (2006.01)
(52) U.S. Cl. .................. 375/224; 375/295; 702/127
(58) Field of Classification Search ............ 375/224, 375/227, 228, 295, 296; 702/66, 67, 68, 702/69, 127; 455/67.11, 67.14, 67.7
See application file for complete search history.

(56) References Cited

U.S. PATENT DOCUMENTS

| | | | | |
|---|---|---|---|---|
| 4,802,098 A * | 1/1989 | Hansen et al. | ................. | 702/67 |
| 5,115,189 A * | 5/1992 | Holcomb | ................. | 324/121 R |
| 5,157,395 A * | 10/1992 | Del Signore et al. | ........ | 341/143 |
| 5,539,772 A | 7/1996 | Fasulo et al. | | |
| 5,872,480 A * | 2/1999 | Huang | ..................... | 329/304 |
| 6,061,394 A * | 5/2000 | Itahara | ....................... | 375/227 |
| 6,484,111 B1 * | 11/2002 | Nara | ........................ | 702/77 |
| 6,628,728 B1 * | 9/2003 | McCarty, Jr. | ................ | 375/296 |
| 6,754,260 B1 * | 6/2004 | Itahara et al. | .............. | 375/224 |
| 7,336,701 B2 * | 2/2008 | Kearney et al. | ............. | 375/224 |

FOREIGN PATENT DOCUMENTS

DE 196 39 680 A1 8/1997

(Continued)

OTHER PUBLICATIONS

TEKTRONIX AWG2020 Datasheet (approximately before 1994).*
Klier J: "Signal Generator SMIQ04B und SMIQ06B: I/Q-Modulation jetzt bis 6.4 GHZ" No. 163, 1999, pp. 8-10, XP002212413 (the whole document), Germany.

(Continued)

*Primary Examiner*—Chieh M Fan
*Assistant Examiner*—Aristocratis Fotakis
(74) *Attorney, Agent, or Firm*—Ditthavong Mori & Steiner, P.C.

(57) ABSTRACT

A signal generator includes a baseband unit, generating a digital, and an I/Q modulator, modulating the digital baseband signal. A storing memory stores a time slot of said digital baseband signal and an optical display unit represents the digital baseband signal stored in said memory according to a predetermined representation mode.

23 Claims, 3 Drawing Sheets

FOREIGN PATENT DOCUMENTS

| | | | |
|---|---|---|---|
| EP | 0 507 470 | * | 10/1992 |
| EP | 0 845 885 A2 | | 6/1998 |
| EP | 0 845 885 A3 | | 6/1998 |
| JP | 62283729 A | | 12/1987 |
| JP | 10224312 A | | 8/1998 |
| WO | WO 01/06685 A1 | | 1/2001 |

OTHER PUBLICATIONS

Kernchen W: Signal Generator SMIQ: Mit neuen Optionen bereit für 3G: Neues von Rohde & Schwarz, No. 166, 2000, pp. 10-12, XP002212291 (p. 11, left column, last paragraph; Figs. 2, 3), Germany.

* cited by examiner

US 7,480,328 B2

SIGNAL GENERATOR WITH DISPLAY UNIT

FIELD OF THE INVENTION

The invention relates to a signal generator for generating a digitally modulated high-frequency signal, for example a mobile-radio signal according to the GSM (Global System for Mobile Communications) Standard or a W-CDMA (wideband code division multiple access) standard.

BACKGROUND OF THE INVENTION

As a rule, hitherto signal generators do not have a display of the baseband signal currently being generated. At best, a static display is available of the theoretically generated signal, but not of the signal actually being generated currently. The observation of the change in the signal as a function of time or a signal evaluation of the baseband signal actually being currently generated is not possible.

SUMMARY OF THE INVENTION

There is therefore a need to provide a signal generator with which a display of the baseband signal currently being generated is possible.

According to one embodiment of the invention, a recording memory is provided that records a time segment after the fashion of an instantaneous picture (snapshot) of the baseband signal. The baseband signal thus recorded can be optionally displayed after suitable signal conditioning in a predeterminable display mode, for example as a constellation diagram, spectrum, code-domain power display or as a CCDF (complementary cumulative distribution function) display. This provides a "pseudo real-time" display.

The display device according to an embodiment of the invention enables the signal change to be observed that the baseband signal undergoes, for example, in a noise unit, a fading unit or a distortion unit. The signal conditioning in the baseband unit can also be checked by observing the signal, for example, upstream and downstream of a pulse-shaping filter or upstream and downstream of a sampling rate converter (resampler). To display the code-domain power of a CDMA signal, it is advantageous to route the signal to the recording memory at the symbol clock level upstream of the pulse-shaping filter since the maximum memory capacity is utilized under such conditions and no symbol clock regeneration is necessary.

It is advantageous for a decimation unit to be available that decimates the data stream of the digital baseband by a predeterminable decimation factor. Consequently, the baseband signal can be observed, for example, at a decimated system clock level and the decimation factor can be optimally matched to the signal to be observed, for example the symbol length or slot length.

There are applications in which the signal can be stored without triggering in the recording memory. For a number of applications, however, triggering is expedient, for example if the memory capacity is smaller than the desired observation time period or if the baseband signal is periodic, for example frame-periodic, and periodic segments of the signal are to be combined for a particular evaluation.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The invention is described in greater detail below by reference to the drawing. In the drawing.

DETAILED DESCRIPTION OF THE PREFERRED EMBODIMENT

Figure 1:
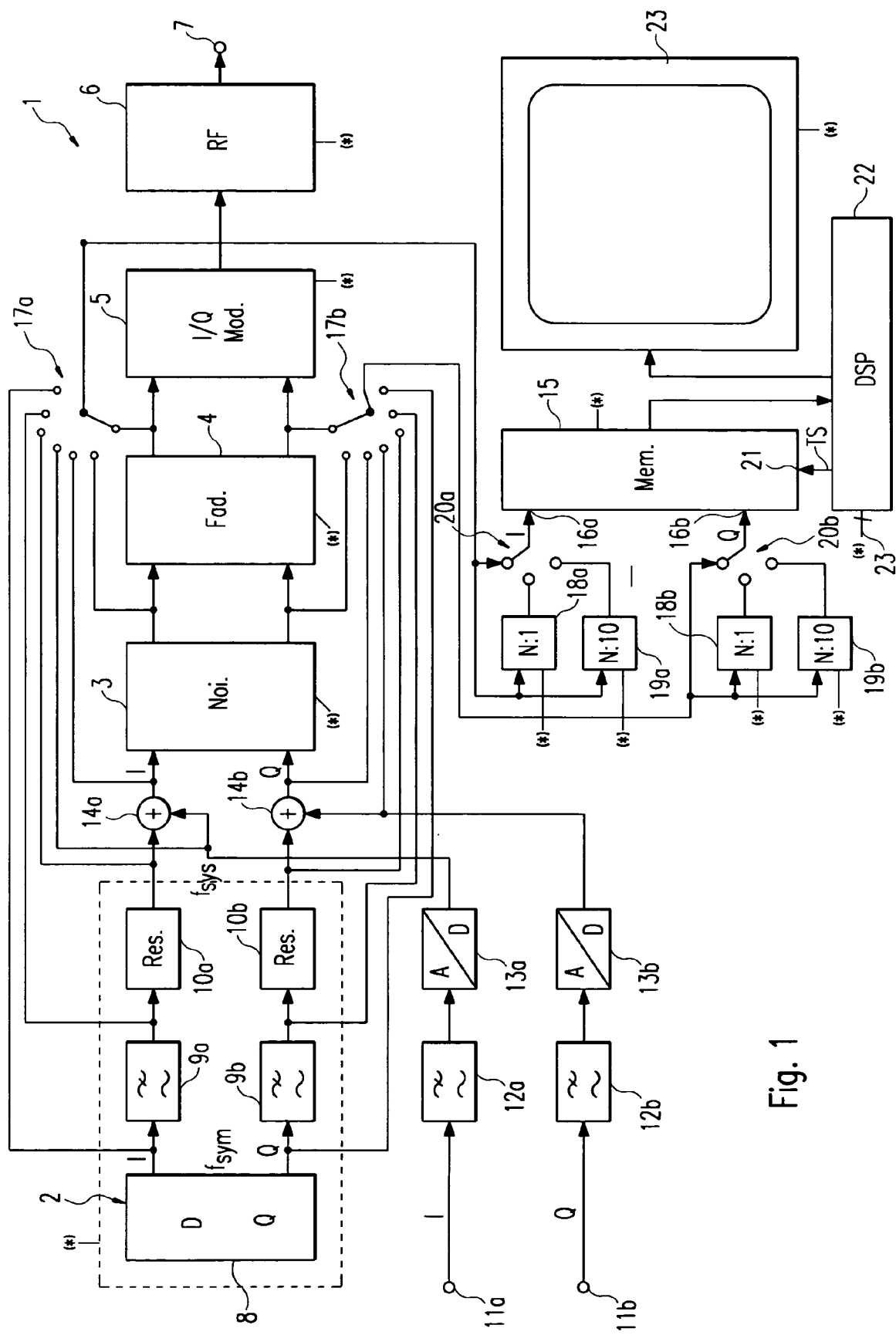
FIG. 1 shows a block circuit diagram of an exemplary embodiment of the signal generator according to the invention.

FIG. 1 shows a block circuit diagram of the signal generator 1 according to the invention. The signal generator 1 serves to generate a digitally modulated high-frequency signal, for example a digitally modulated mobile-radio signal according to the GSM standard, the GSM-EDGE standard or a W-CDMA standard for third-generation mobile radio (UMTS).

A baseband unit generates a baseband signal having an I (in-phase) component and a Q (quadrature phase) component. The digital baseband signal generated by the baseband unit 2 can be routed to an I/Q modulator 5 via a plurality of signal-modifying units, for example a noise unit 3 that exposes the baseband signal to noise, and a fading unit 4 that exposes the baseband signal to fading or distortion. Between the baseband unit 2 and the I/Q modulator 5, a signal path is present for the I component and a signal path for the Q component, respectively. The I/Q modulator 5 modulates the digital baseband signal into an analog signal that is converted by the high-frequency unit 6 into the corresponding high-frequency band. The digitally modulated high-frequency signal is available at the output 7 of the signal generator 1.

The baseband unit 2 has a data source 8 that generates data symbols comprising an I component and a Q component at a symbol clock $f_{sym}$. One pulse-shaping filter 9a and 9b, respectively, is provided in each case for the I component and the Q component, respectively. The pulse-shaping filters 9a and 9b have, for example, a low-pass characteristic and transform the pulses at the output of the data source 8 into a pulse shape favourable for transmission. In one sampling rate converter (resampler) in each case for the I component and Q component 10a and 10b, respectively, the sampling rate is increased to the system clock rate $f_{sys}$. The system clock rate $f_{sys}$ may, for example, be 80 MHz.

An input 11a may be present for the I component of an externally suppliable signal and an input 11b may be present for the Q component of an externally suppliable analog signal. Said external analog signal undergoes in one low-pass, 12a and 12b respectively, in each case, a band limitation and is converted in each case into a digital I component and digital Q component, respectively, at analog/digital converters 13a and 13b, respectively. Said external I component can be added to the I output component of the baseband unit 2 at an adder 14a, while the external Q component can be added to the Q output component of the digital baseband unit 2 at an adder 14b.

According to the invention, a recording memory 15 is present that can record in each case a time segment of the digital baseband signal. For this purpose, an I input 16a of the recording memory 15 can be connected via a first switching device 17a and a Q input 16b of the recording memory 15 can be connected via a second switching device 17b having a plurality of positions in the signal path of the I component or the Q component. In the exemplary embodiment shown, a signal tap is situated at the output of the data source 8, a signal tap is situated at the output of the pulse-shaping filters 9a or 9b, respectively, a signal tap is situated at the inputs of the adder 14a or 14b, respectively, a signal tap is situated at the output of the adder 14a or 14b, respectively, a signal tap is situated at the output of the noise unit 3 and a further signal tap is situated at the output of the fading unit 4 and the input of the I/Q modulator 5.

Preferably, one or more decimation units 18a and 18b, respectively, and 19a and 19b, respectively, are situated at the input of the recording memory 15. While the decimation units 18a and 18b decimate the data stream of the baseband signal by a decimation factor N, the data stream is decimated in each case by the decimation unit 19a and 19b by, for example, the decimation factor N:10, which is smaller by a factor of 10, the decimation factor N being freely selectable. The I input 16a can be connected either directly to the output of the first switching device 17a or to the output of one of the decimation units 18a and 19a via a third switching device 20a. Correspondingly, the Q input 16b of the recording memory 15 can be connected either directly to an output of the second switching device 17b or to an output of one of the decimation units 18b and 19b.

The start of the time segment that the recording memory 15 records can be controlled by a trigger signal TS that is routed to a trigger input 21 of the recording memory 15. The trigger signal TS is generated, for example, by a digital signal processor 22 that is connected via a control bus 23 also to the digital baseband unit 2, the noise unit 3, the fading unit 4, the I/Q modulator 5, the high-frequency unit 6 and the decimation units 18a, 19a, 18b and 19b. The connection of the control bus 23 is designated by (*). The digital signal processor 22 controls the entire signal conditioning and is, consequently, capable of generating the trigger signal TS in time synchronism with the baseband signal at the corresponding signal tap.

Furthermore, a display device 23 is present with which the digital baseband signal stored in the recording memory 15 can optionally be displayed in a predeterminable display mode after a suitable display conditioning in the digital signal processor 22. The display device 23 is, for example, a viewing screen. The recording memory 15 according to the invention makes possible, in conjunction with the display device 23 according to the invention, a "pseudo real-time" signal display and a signal analysis in the signal generator 1, for example, for displaying a complementary cumulative distribution function CCDF, a constellation diagram, the variation with time of the I signal and Q signal, the spectrum or a code-domain power display. With respect to the code-domain power display in general, but not in the case of a signal generator, reference is made to DE 100 56 258 A1 of the same applicant.

Figure 2:
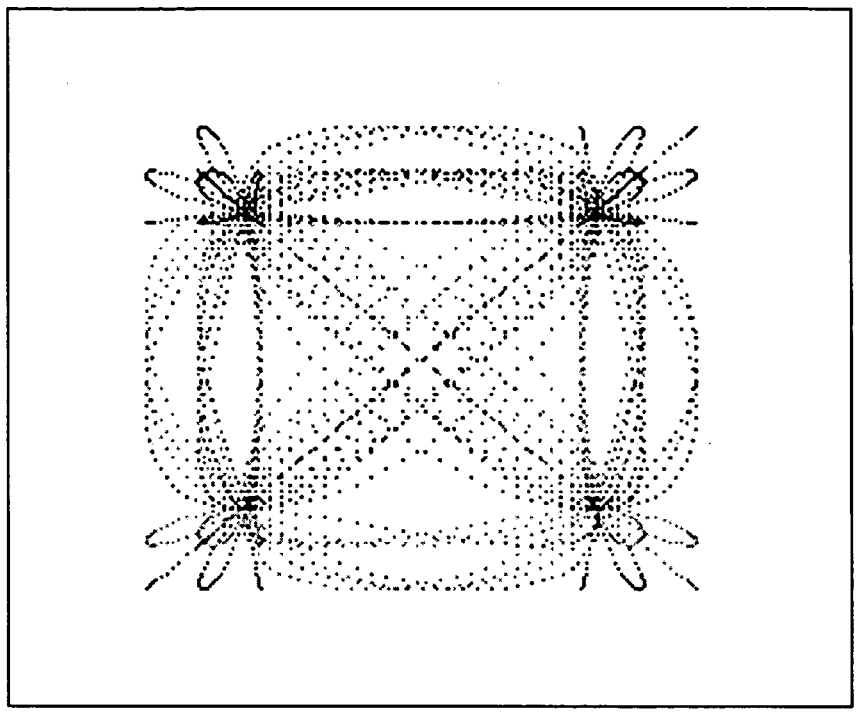
FIG. 2 shows an example of a constellation diagram of a QPSK signal displayed on the display device of the signal generator according to the invention.

FIG. 2 shows an example of a display of a constellation diagram for a QPSK signal. The four state points in the I/Q level and the transitions at the state change are evident.

Figure 3:
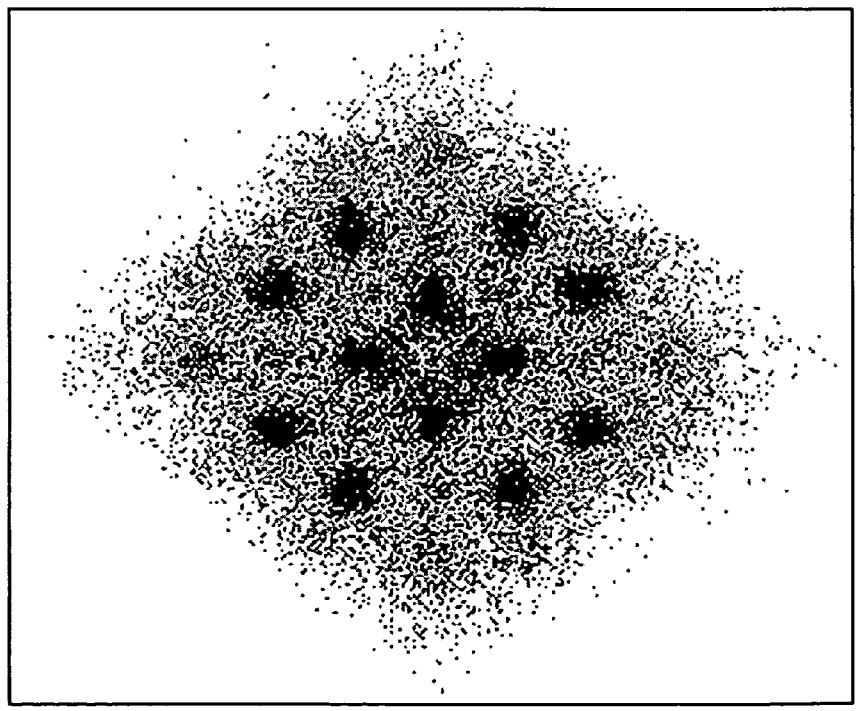
FIG. 3 shows an example of a constellation diagram of a W-CDMA signal displayed on the display device of the signal generator according to the invention.

FIG. 3 shows an example of a plurality of superimposed W-CDMA signals in the constellation diagram.

Figure 4:
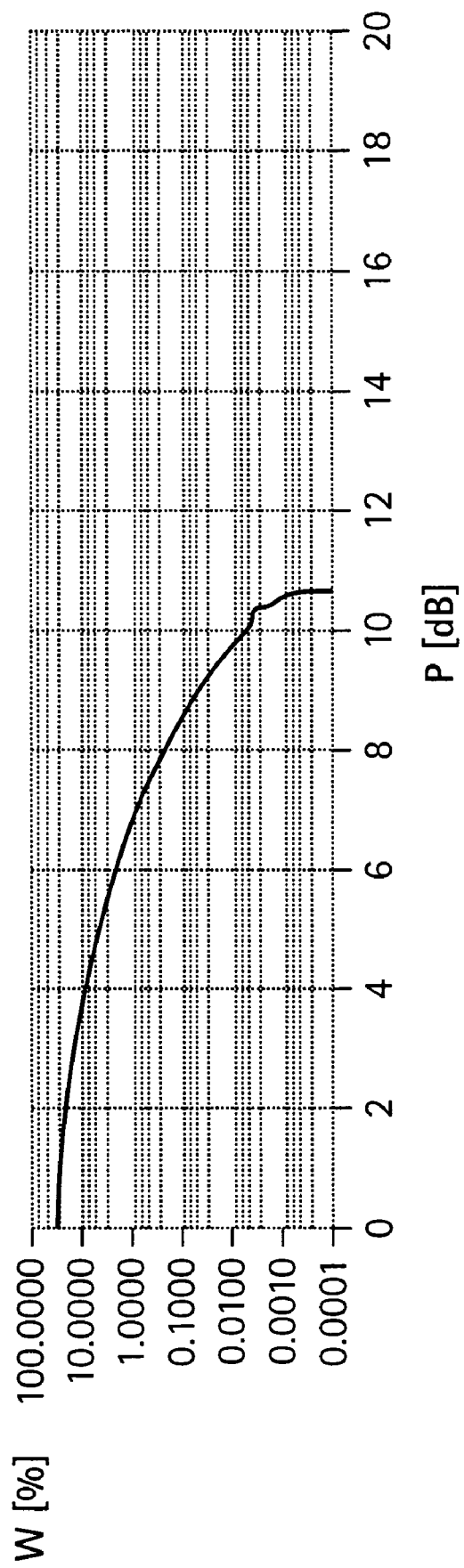
FIG. 4 shows an example of a CCDF (complementary cumulative distribution function) display on the display device of the signal generator according to the invention.

FIG. 4 shows a CCDF display. The "complementary cumulative distribution function" (CCDF) indicates the frequency W at which the contributions of the complex sampling values exceed a certain predetermined amount, for example the mean power. If the limit amount is interpreted as the radius of a circle around the origin, the radius is plotted to the right and the frequency of the sampling values that lie outside said circle is plotted upwards.

The recording memory 15 makes possible, so to speak, a "snapshot" of the signal, that is to say a recording of the signal in a limited time segment. After the signal has been recorded in the recording memory 15, the recording memory 15 in the exemplary embodiment is read out by the digital signal processor 22 and the next signal recording can be started immediately. The recorded signals are either displayed immediately on the visual display device 23 or, after analysis and preprogramming steps to be undertaken in the digital signal processor 22, are displayed in appropriate graphical form on the display device 23. The display of external signals routed via the inputs 11a and 11b is also possible. Consequently, it is possible to check, for example, whether the injected signal exhibits the expected behaviour or whether the measurement setup is correctly cabled.

Since it is not an idealized, theoretically calculated signal that is displayed but the signal actually measured, all the effects of the baseband signal generation, for example the bit resolution of the digital components, transient processes and the effect of the analog band-limitation filters 12a and 12b, can be recognized and an assessment of the signal quality is possible. If the output signal of the signal generator 1 is used as a stimulus for a test object, it is consequently already possible to investigate in the signal generator 1 the signal errors which the output signal of the signal generator 1 has. Consequently, the assessment of the signal modification by the test object is facilitated.

Furthermore, the consequences of parameter changes in the setting of the signal generator 1, for example changes in the type of modulation, the noise amplitude or the fading are immediately evident on the display device 23. The monitoring of external interfaces is also possible. With the increasingly complex digital transmission systems, for example of the third generation mobile radio (UMTS), the signal display makes it possible to check the set parameters in "pseudo real time" and, consequently, for the first time makes the operation reasonably possible as complexity increases. For example, the consequence of limitation effects (clipping) or connecting up a second base station or mobile station on the code domain of a CDMA signal of the signal displayed on the display device 23 is possible and facilitates the selection of the parameters affected.

Depending on the type of display and depending on whether the signal has been generated internally or externally, a signal tap at different points is expedient. A tap at the level of the symbol clock $f_{sym}$ upstream of the pulse-shaping filters 9a, 9b is expedient, for example, for a code-domain power display since the maximum memory capacity is utilized and symbol clock regeneration is unnecessary. A tap at the level of the system clock $f_{sys}$ makes possible a maximum time resolution of the internal and external signals. An optimum matching of the display to internal and external signals is possible at the level of a system clock $f_{sys}/N$ decimated by the decimation units 18a, 19a, 18b, 19b (for example reduction of the system clock from 80 MHz to a decimated system clock of 40, 20, 10 or 5 MHz). The decimation factor N may either be adjusted automatically, for example matched to the signal bandwidth, or can be set manually in order to observe and evaluate the signal in various enlargement steps (zoom steps).

For particular types of display, it is necessary for the time segment captured by the recording memory 15 to have a certain length since the combination of medium and shorter signal segments is not easily possible. For the purpose of displaying spectra and time-dependent signal display, this minimum length depends on the desired resolution. For a code-domain power display, it is expedient to be able to record at least two symbols of maximum length since the determination of the channel power of a code channel requires at least one complete symbol. If the time segment captured by the recording memory 15 captures at least two symbols, it is certain that the complete symbol is contained in the time segment captured even in the case of an untriggered measurement.

It is also possible to combine a plurality of signal segments from a plurality of time segments captured consecutively. In the case of some types of display, the combination of subsegments of the baseband signal is possible without triggering. This applies, for example, to the CCDF display shown in FIG. 4, an averaged spectrum or the constellation diagram shown in FIGS. 2 and 3.

If the signal segment to be analysed is longer than the time segment capturable as a maximum by the recording memory 15, a plurality of time segments can be seamlessly joined to one another by suitable choice of the trigger signal TS. This makes it possible to analyse longer signal segments even with limited memory capacity of the recording memory 15. In the case of a frame-periodic W-CDMA signal subdivided into a plurality of timeslots, the individual timeslots of a frame can be recorded consecutively if the recording memory 15 cannot capture a complete frame because of its limited memory capacity. The complete frame can be seamlessly assembled from the individual subrecordings. This method can also be used to display an eye diagram at symbol level.

While the present invention has been described in connection with a number of embodiments and implementations, the present invention is not so limited but covers various obvious modifications and equivalent arrangements, which fall within the purview of the appended claims.

What is claimed is:

1. A signal generator comprising:
a baseband unit configured to generate a digital baseband signal;
an I/Q modulator configured to modulate the digital baseband signal;
a recording memory configured to record a time segment of the digital baseband signal in a state prior to modulation by the I/Q modulator;
at least one or more signal modification units provided between the baseband unit and the I/Q modulator, wherein the signal at the input and output of each signal modification unit is routed via switching devices to the recording memory without further modification of each signal between each signal modification unit and the recording memory;
a visual display device configured to display the digital baseband signal stored in the recording memory in a predeterminable display mode, wherein the visual display device is configured to display the digital baseband signal in the state prior to modulation by the I/Q modulator,
wherein an I input of the recording memory can be connected via a first switching device and a Q input of the recording memory can be connected via a second switching device having a plurality of positions in the signal path of the I component or the Q component;
a plurality of decimation units coupled to the recording memory and configured to decimate the data stream of the digital baseband signal,
wherein a third switching device is coupled between a first one of the decimation units and the I input of the recording memory, and a fourth switching device is coupled between a second one of the decimation units and the Q input of the recording memory.

2. A signal generator according to claim 1, wherein one of the signal modification units is a noise unit and/or a fading unit and/or a distortion unit.

3. A signal generator according to claim 1, wherein the baseband unit has at least one sampling rate converter (resampler) and the signal at the input and/or output of each sampling rate converter can be routed to the recording memory.

4. A signal generator according to claim 1, wherein the baseband unit has at least one pulse-shaping filter and the signal at the input and/or output of each pulseshaping filter can be routed to the recording memory.

5. A signal generator according to claim 4, wherein the code-domain power of a CDMA signal is displayed on the display device and a symbol clock rate signal upstream of the pulse-shaping filter is routed to the recording memory.

6. A signal generator according to claim 1, wherein the start of the time segment that the recording memory records is controlled by a trigger signal (TS).

7. A signal generator according to claim 6, wherein the trigger signal (TS) is chosen in such a way that a plurality of time segments can be joined seamlessly to one another.

8. A signal generator according to claim 6, wherein the trigger signal (TS) is chosen in such a way that the time segments each cover periodic segments of a periodic baseband signal.

9. A signal generator according to claim 6, wherein the third switching device is further coupled between a third one of the decimation units and the I input of the recording memory to provide selection between the first decimation unit and the third decimation unit, and the fourth switching device is further coupled between a fourth one of the decimation units and the Q input of the recording memory to provide selection between the second decimation unit and the fourth decimation unit.

10. A signal generator according to claim 9, wherein the first decimation unit and the third decimation unit have different decimation factors, and the second decimation unit and the fourth decimation unit have different decimation factors.

11. A signal generator according to claim 1, wherein plural signal modification units are provided between the baseband unit and the I/Q modulator, and wherein the signal modification units are connected in series.

12. A signal generator comprising:
a baseband unit configured to generate a digital baseband signal;
an I/Q modulator configured to modulate the digital baseband signal;
a recording memory configured to record a time segment of the digital baseband signal in a state prior to modulation by the I/Q modulator;
a visual display device configured to display the digital baseband signal stored in the recording memory in a predeterminable display mode, wherein the visual display device is configured to display the digital baseband signal in the state prior to modulation by the I/Q modulator; and one or more signal modification units provided between the baseband unit and the I/Q modulator, wherein the signal at the input and output of each signal modification unit is routed via switching devices to the recording memory without further modification of each signal between each signal modification unit and the recording memory.

13. A signal generator according to claim 12, wherein an I input of the recording memory can be connected via a first switching device and a Q input of the recording memory can be connected via a second switching device having a plurality of positions in the signal path of the I component and the Q component, respectively, and wherein the plurality of positions in the signal path are upstream of the I/Q modulator.

14. A signal generator according to claim 12, wherein the baseband unit has at least one sampling rate converter (resampler) and the signal at the input and/or output of each sampling rate converter can be routed to the recording memory.

15. A signal generator according to claim 12, wherein the baseband unit has at least one pulse-shaping filter and the signal at the input and/or output of each pulse-shaping filter can be routed to the recording memory.

16. A signal generator according to claim 15, wherein the code-domain power of a CDMA signal is displayed on the display device and a symbol clock rate signal upstream of the pulse-shaping filter is routed to the recording memory.

17. A signal generator according to claim 12, wherein the start of the time segment that the recording memory records is controlled by a trigger signal (TS).

18. A signal generator according to claim 17, wherein the trigger signal (TS) is chosen in such a way that a plurality of time segments can be joined seamlessly to one another.

19. A signal generator according to claim 17, wherein the trigger signal (TS) is chosen in such a way that the time segments each cover periodic segments of a periodic baseband signal.

20. A signal generator according to claim 12, further comprising a plurality of decimation units coupled to the recording memory and configured to decimate the data stream of the digital baseband signal.

21. A signal generator according to claim 11, wherein the signal modification units include a fading unit and a noise unit.

22. A signal generator according to claim 12, wherein plural signal modification units are provided between the baseband unit and the I/Q modulator, and wherein the signal modification units are connected in series.

23. A signal generator according to claim 22, wherein the signal modification units include a fading unit and a noise unit.

* * * * *